US005296774A

United States Patent [19]

Nishiwaki

[11] Patent Number: 5,296,774

[45] Date of Patent: Mar. 22, 1994

[54] MINIATURE MOTOR WITH BRUSH PIECES FORMING DIFFERENT ANGLES WITH COMMUTATOR

[75] Inventor: Satoshi Nishiwaki, Matsudo, Japan

[73] Assignee: Mabuchi Motor Co., Ltd., Chiba, Japan

[21] Appl. No.: 968,202

[22] Filed: Oct. 29, 1992

[30] Foreign Application Priority Data

Oct. 30, 1991 [JP] Japan ........................ 3-088835[U]

[51] Int. Cl.[5] ........................ H02K 13/00

[52] U.S. Cl. ........................ 310/248; 310/40 MM

[58] Field of Search ........................ 310/40 MM, 248, 249, 310/251-253, 51, 154, 239, 89, 233

[56] References Cited

U.S. PATENT DOCUMENTS 3,191,084 6/1965 Ooka ........................ 310/252
4,319,153 3/1982 Mabuchi ........................ 310/233
4,358,699 11/1982 Wilsdorf ........................ 310/251
4,500,804 2/1985 Akiyama ........................ 310/40 MM
4,705,978 11/1987 Mabuchi ........................ 310/248
4,896,065 1/1990 Tsuyama ........................ 310/40 MM

*Primary Examiner*—R. Skudy
*Attorney, Agent, or Firm*—McGlew and Tuttle

[57] ABSTRACT

A miniature motor including a housing formed into a bottomed hollow cylindrical shape and having a permanent magnet fixedly fitted to the inner circumferential surface thereof, an end plate engaged with an opening of the housing, and a rotor rotatably supported by bearings provided on the housing and the end plate. Power is fed to the motor by bringing a commutator constituting the rotor into sliding contact with brushes, in which a plurality of brush pieces branched from the brush are formed in such a manner that tangential lines formed by the brush pieces with respect to the commutator at predetermined contact points are made different at the tips of the brush pieces, and that the tips of brush pieces make different angles from the lines extended in the longitudinal direction of the brush pieces. The tips of brush pieces are bent to form a V shape in cross section. The tips of the brush pieces come in contact with the commutator at the opened legs of the V-shaped cross section.

6 Claims, 6 Drawing Sheets

MINIATURE MOTOR WITH BRUSH PIECES FORMING DIFFERENT ANGLES WITH COMMUTATOR

BACKGROUND OF THE INVENTION

This invention relates generally to a miniature motor, and more particularly to a miniature motor having such a construction that a plurality of brush pieces branched from a power-feeding brush come in contact with a commutator at shifted locations in the circumferential direction.

DESCRIPTION OF THE PRIOR ART

FIG. 1 is a cross-sectional view illustrating the essential part of an example of a miniature motor to which this invention is applied. In FIG. 1, a housing 1 is made of a metallic material, such as mild steel, and formed into a bottomed hollow cylindrical shape, and a permanent magnet 2 of an arc-segment shape is fixedly fitted to the inner circumferential surface thereof. In the housing 1, a rotor comprising an armature facing the permanent magnet 2 and a commutator 4 is provided. An end plate 6 is made of the same material as that of the housing 1, for example, and engaged with the opening of the housing 1. A brush 7 is provided in such a manner as to make sliding contact with the commutator 4, and electrically connected to an input terminal 8. The input terminal 8 is inserted in a terminal insulating part 10 in such a manner as to protrude from the end plate 6. Bearings 9 are provided on the bottom of the housing 1 and in a bearing retainer 11 formed by protruding part of the end plate 6 outward to support a rotating shaft 13 to which the rotor 5 is fixedly fitted.

With the above construction, as current is fed to the armature 3 from the input terminal 8 via the brush 7 and the commutator 4, rotating force is imparted to the armature 3 existing in a magnetic field formed by the permanent magnet 2 fixedly fitted to the inner circumferential surface of the housing, causing the rotor 5 to rotate and drive external equipment (not shown) via the rotating shaft 13.

FIGS. 2 through 4 are diagrams showing the state where the brushes make sliding contact with the commutator in a miniature morot of a conventional type. As shown in FIG. 2, the brush 7 is fixedly fitted to a brush-/terminal mount 8*a* electrically connected to the input terminal 8. The brush 7 has a plurality of brush pieces 7*a*, 7*b* and 7*c* (three pieces in this case). The brush pieces 7*a*, 7*b* and 7*c* have the same shape, and the tip of each brush piece is bent into a V shape in cross section.

The brush pieces 7*a*, 7*b* and 7*c* make contact with the commutator 4 at the tip portions bent into a V shape (V-shaped portions). That is, the V-shaped portions are forced onto the outer circumferential surface of the commutator 4 at an appropriate pressure (brush pressure) by the resiliency of the brush pieces 7*a*, 7*b* and 7*c*, as shown in FIG. 3. At this time, the brush piece V-shaped portions that make contact with the commutator 4 are the peak portions of the V-shaped portions.

According to the aforementioned prior art, since the brush pieces 7*a*, 7*b* and 7*c* are of the same shape, the contact angles $\theta_0$ made by the brush pieces and the outer circumferential surface of the commutator 4 becomes equal, and the locations at which the brush pieces make contact with the commutator 4 become equal tin terms of rotating direction. Consequently, the brush pieces 7*a*, 7*b* and 7*c* pass a groove 4*a* of the commutator 4 at the same timing. This leads to an abrupt switching of electric current, causing sparks and electrical noises to be generated. These sparks and noises tend to disturb commutated waveforms, resulting in unstable rotation.

To overcome these problems, this invention conceived a technique as shown in FIG. 5. This technique involves the contact with the commutator 4 by the open legs of the V-shaped portions of the brush pieces 7*a*, 7*b* and 7*c* (other feature of the construction are the same as shown in FIGS. 2 through 4), and the stabilization of commutated waveforms by making sliding contact between the brush pieces 7*a*, 7*b* and 7*c* and the commutator 4 stable by varying the cross-sectional shape of the V-shaped portions. With this technique, however, it was proven that commutated waveforms tend to be disturbed depending on the service conditions of the motor, and that satisfactory results cannot be achieved. This is attributable to the fact that the contact points between the brush pieces 7*a*, 7*b* and 7*c* and the commutator 4 are located at the same locations in terms of rotation.

In another example of the prior art, on the other hand, in which more than two contact points (contact angles $\theta_{oa}$, $\theta_{ob}$) are used, a great difference is caused in brush pressure because the brush pieces 7*a* and 7*b* are different in length. In addition, the difference in the lengths of the brush pieces 7*a* and 7*b* tends to become too large.

SUMMARY OF THE INVENTION

It is an object of this invention to provide a miniature motor that makes commutated waveforms and rotation stable by suppressing electrical noises and sparks.

DETAILED DESCRIPTION OF THE EMBODIMENT

Figure 7:
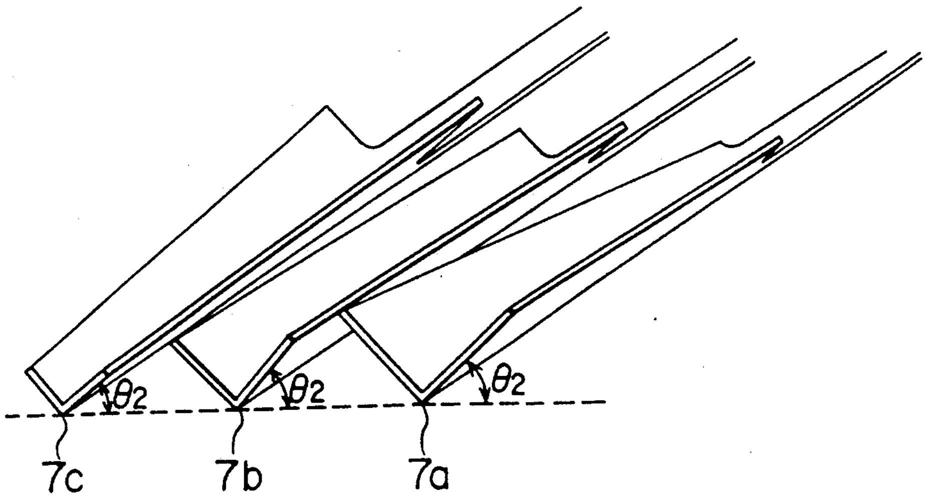
FIGS. 7 through 9 are a perspective view, development and side view illustrating the tips of brush pieces in the embodiments of this invention, respectively.
Figure 8:
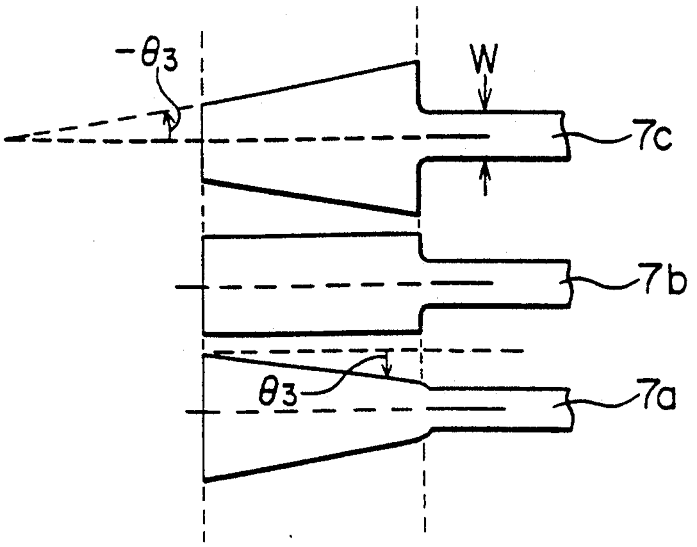
Figure 9:
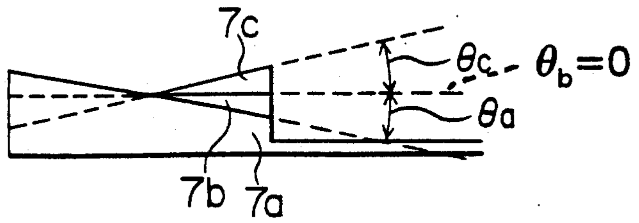
Figure 10:
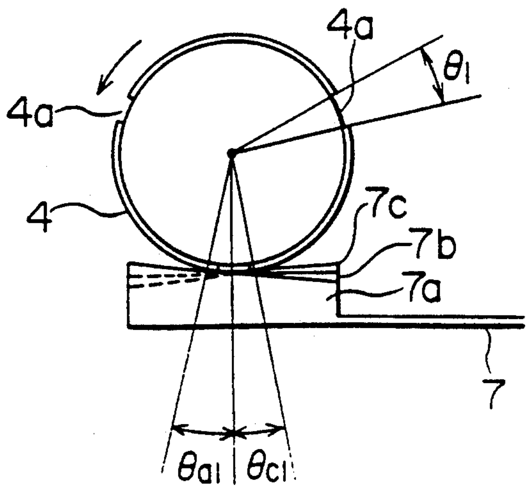
FIG. 10 is a diagram showing the state where the brush pieces make sliding contact with the commutator in an embodiment of this invention.

FIGS. 7 through 9 are a perspective view, development and side view illustrating the tips of brush pieces in an embodiment of this invention. FIG. 10 is a diagram illustrating the state where the brush pieces make sliding contact with the commutator in an embodiment of this invention.

As shown in FIG. 8, the tips of the brush pieces 7a, 7b and 7c are formed in such a manner that the width of the tips is wider than the width W of the middle parts thereof, and each of the tips has two sides inclined at different angles to the line extended in the longitudinal direction of the brush pieces 7a, 7b and 7c. It should be noted, however, that the tip of the brush piece 7b is parallel with the aforementioned extended lines (at an angle of zero degrees). With the brush piece 7b as the standard, the tip of the brush piece 7a makes an angle of $\theta_3$ to the aforementioned extended lines, whereas the tip of the brush piece 7c makes an angle of $-\theta_3$ to the aforementioned extended lines (the same angle as $\theta_3$ in the opposite direction).

The tips of the brush pieces 7a, 7b and 7c shown in FIG. 8 are bent at the bending lines as their respective centerlines to form a V shape as shown in FIG. 7. The bending angle $\theta_2$ is the same for the brush pieces 7a, 7b and 7c, as shown in FIG. 7. FIG. 7 shows the completed shapes of the brush pieces 7a, 7b and 7c.

With a brush piece having such a shape, the inclined angle $\theta_a$ of the tip shown in FIG. 9 can be expressed by the following equation.

$$\tan\theta_a = \tan\theta_3 \cdot \sin\theta_2$$

where $\theta_3$ is an inclined angle when the tip shown in FIG. 8 is developed, and $\theta_2$ is the bending angle to form into a V shape. The inclined angle $\theta_c$ of the tip of the brush piece 7c shown in FIG. 9 is determined in the same manner. The inclined angle of the brush piece 7b when the tip thereof is opened is 0 degrees. the inclined angle of the tip thereof is considered as the standard angle, that is, 0 degrees. Consequently, the inclined angles of the brush pieces 7a and 7c on both sides of the brush piece 7b are $\theta_a$ and $\theta_c$ ($|\theta_a| = |\theta_c|$) in the opposite directions. The inclined angle of the brush piece 7b in a side view is expressed as $\theta_b$ (=0 degrees) (not shown).

The angles $\theta_a$, $\theta_b$ and $\theta_c$ affect directly the positions at which the brushes 7 make sliding contact with the commutator 4. That is, the two edges of the opened legs of the V-shaped portions of the brush pieces 7a, 7b and 7c become tangential lines with the outer circumferential surface of the commutator 4. The contact positions are therefore determined by the angles $\theta_a$, $\theta_b$ and $\theta_c$. The angle $\theta_a$ is, on the other hand, determined by the angles $\theta_3$ and $\theta_2$. Since the angle $\theta_2$ is common to the brush pieces 7a, 7b and 7c, the angle $\theta_a$ as a relative angel is determined by the angle $\theta_3$. That is, taking advantage of the fact that the tips of the brush pieces 7a, 7b and 7c form tangential lines with the commutator 4, this invention has such a construction that the tips of the brush pieces 7a, 7b and 7c have different angles when developed.

Superposing the commutator 4 on FIG. 9 yields FIG. 10. If the position at which the brush piece 7b at the center is regarded as the standard (contact angle =0), the brush pieces 7a and 7c make contact with the commutator 4 at the contact angles $\theta_{a1}$ and $\theta_{c1}$. Consequently, the brush pieces 7a, 7b and 7c make contact with the commutator 4 at different contact positions in terms of the rotating direction. In FIG. 10, as the commutator 4 is rotated in the direction shown by an arrow, the brush pieces 7a, 7b and 7c pass the groove 4a at equal time intervals in that order. This allows electric current to be switched gradually, thus suppressing spark generation, making commutated waveforms stable, leading to stabilized rotation.

Figure 1:
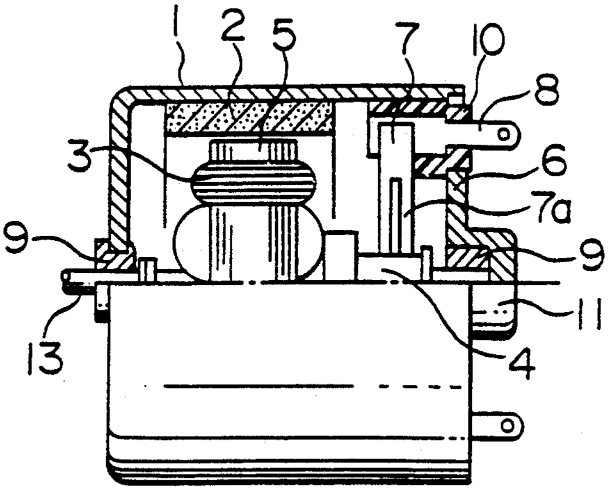
FIG. 1 (PRIOR ART)
FIG. 1 is a cross-sectional view illustrating of an example of a prior art miniature motor.
Figure 2:
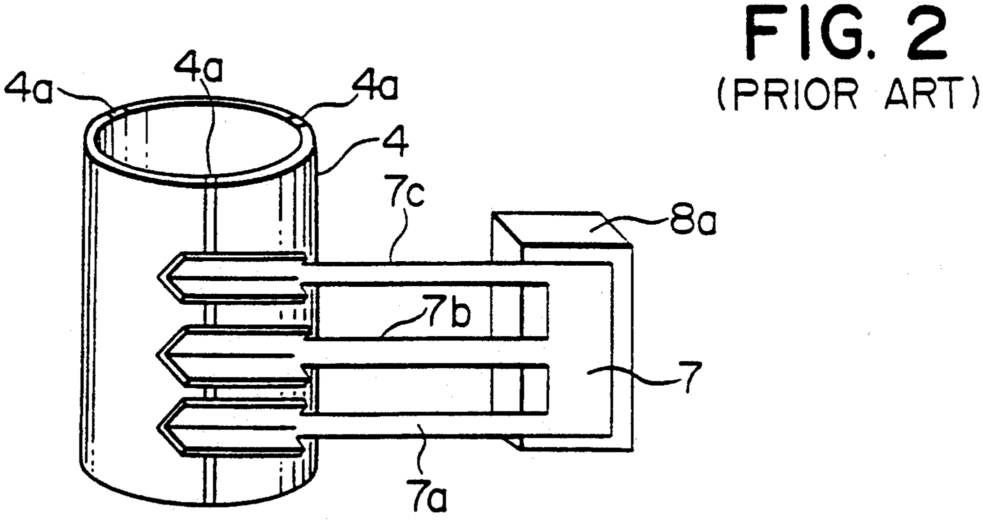
FIG. 2 (PRIOR ART)
FIGS. 2 through 4 are diagrams illustrating the state where the brushes and the commutator make sliding contact in a miniature motor of a conventional type (Prior Art).
Figure 3:
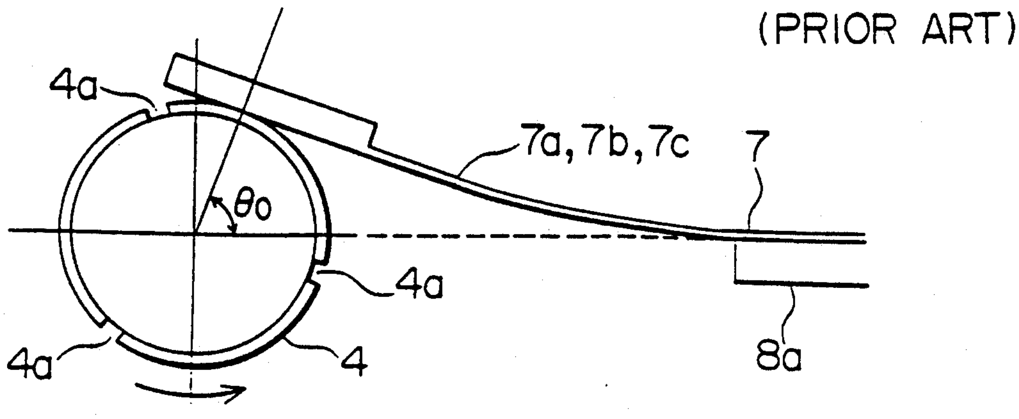
FIG. 3 (PRIOR ART)
Figure 4:
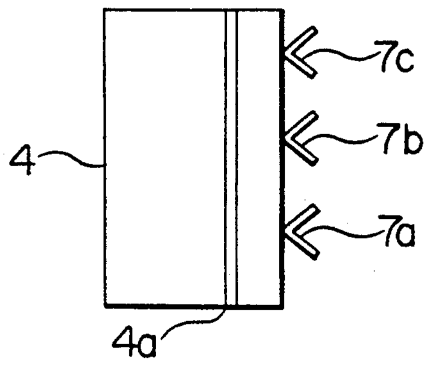
FIG. 4 (PRIOR ART)
Figure 5:
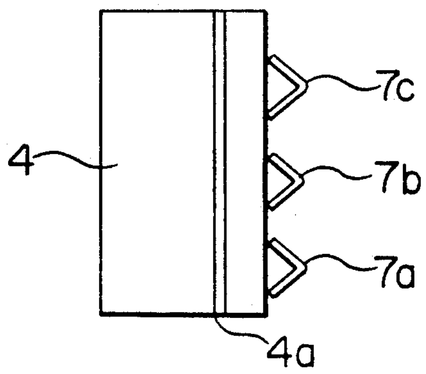
FIG. 5 (PRIOR ART)
FIG. 5 is a diagram showing the technique of the prior art the present inventor studied.

In this state, the brush 7 is mounted on the input terminal 8 as in the case shown in FIG. 2, the tips of the brush pieces 7a, 7b and 7c are forced onto the commutator 4, as shown in FIG. 3, and the opened legs of the V-shaped portion makes contact with the commutator 4, as shown in FIG. 5.

Figure 6:
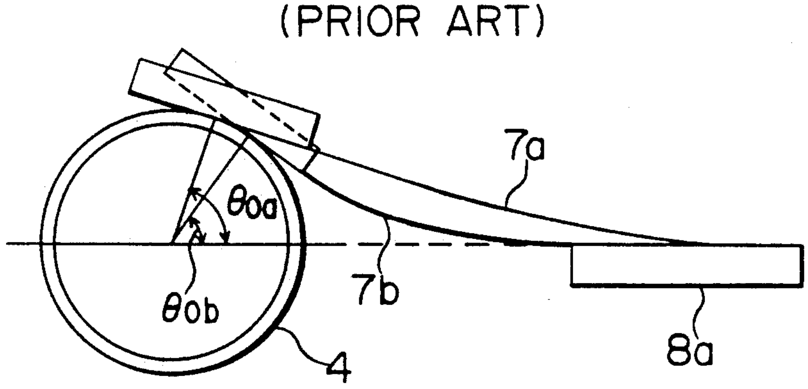
FIG. 6 (PRIOR ART)
FIG. 6 is a diagram of assistance in explaining other example of the prior art.

Note that the angle $\theta_1$ of the groove 4a (see FIG. 10) may be made larger in some miniature motor types. In such a case, the contact angles $\theta_{a1}$ and $\theta_{c1}$ have to be made larger. This invention, however, can easily cope with such cases by increasing the inclined angles $\theta_a$ and $\theta_c$ appropriately. That is, contact angles that are sufficiently effective in spark suppression, for example, approximately 7 to 25 degrees, can be obtained by changing the inclined angles $\theta_a$ and $\theta_c$. In this way, even when the inclined angles $\theta_a$ and $\theta_c$ are made larger, this invention makes it possible to keep the difference in brush pressure within a negligible range, unlike the case shown in FIG. 6.

Figure 11:
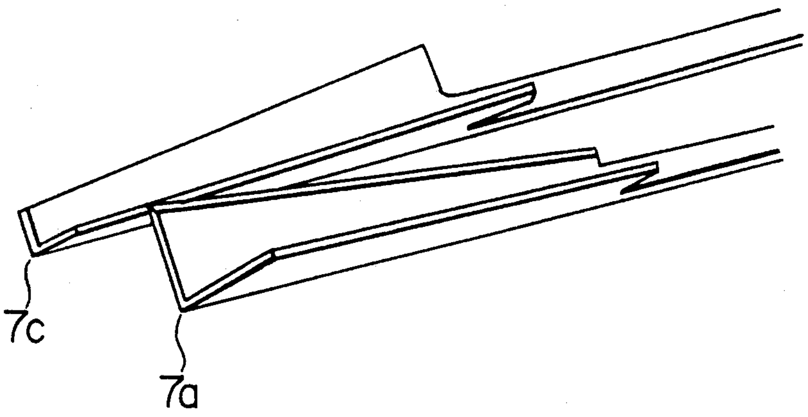
FIG. 11 is a perspective view showing a variation of the brush piece.

The number of brush pieces is not limited to three, and may be two, as shown in FIG. 11. FIG. 11 shows a case where the brush piece 7b at the center among the brush pieces 7a, 7b and 7c as shown in FIGS. 7 through 10 is not provided.

Figure 12:
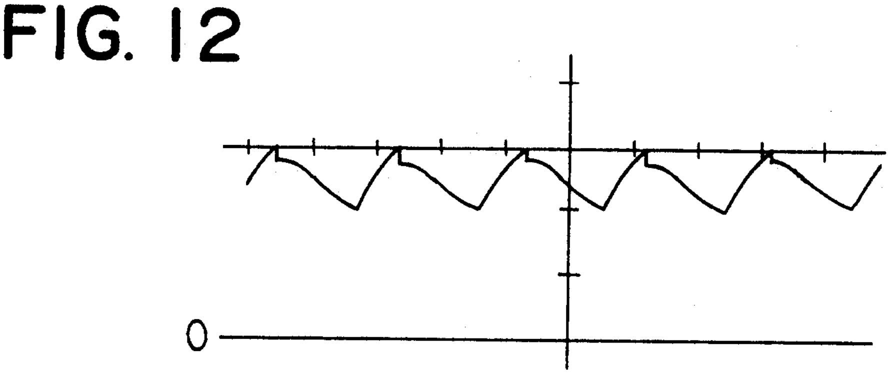
FIG. 12 is a diagram illustrating commutated waveforms in a miniature motor.
Figure 13:
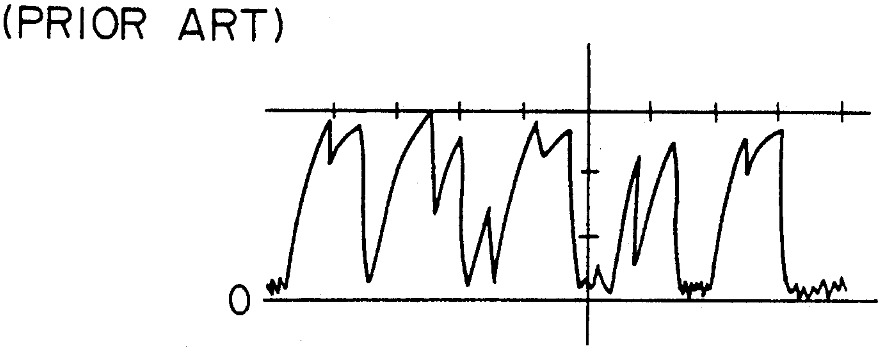
FIG. 13 (PRIOR ART)
FIG. 13 is a diagram illustrating prior art.

FIGS. 12 and 13 show commutated waveforms; FIG. 12 showing the commutated waveform obtained with a miniature motor using the brush 7 (as shown in FIGS. 7 through 10) of this invention, and FIG. 13 showing the commutated waveform with a miniature motor using the conventional brush for comparison. In FIG. 13, sparks, that is, electrical noises are found generated frequently, while FIG. 12 shows virtually no electrical noises.

Figure 14:
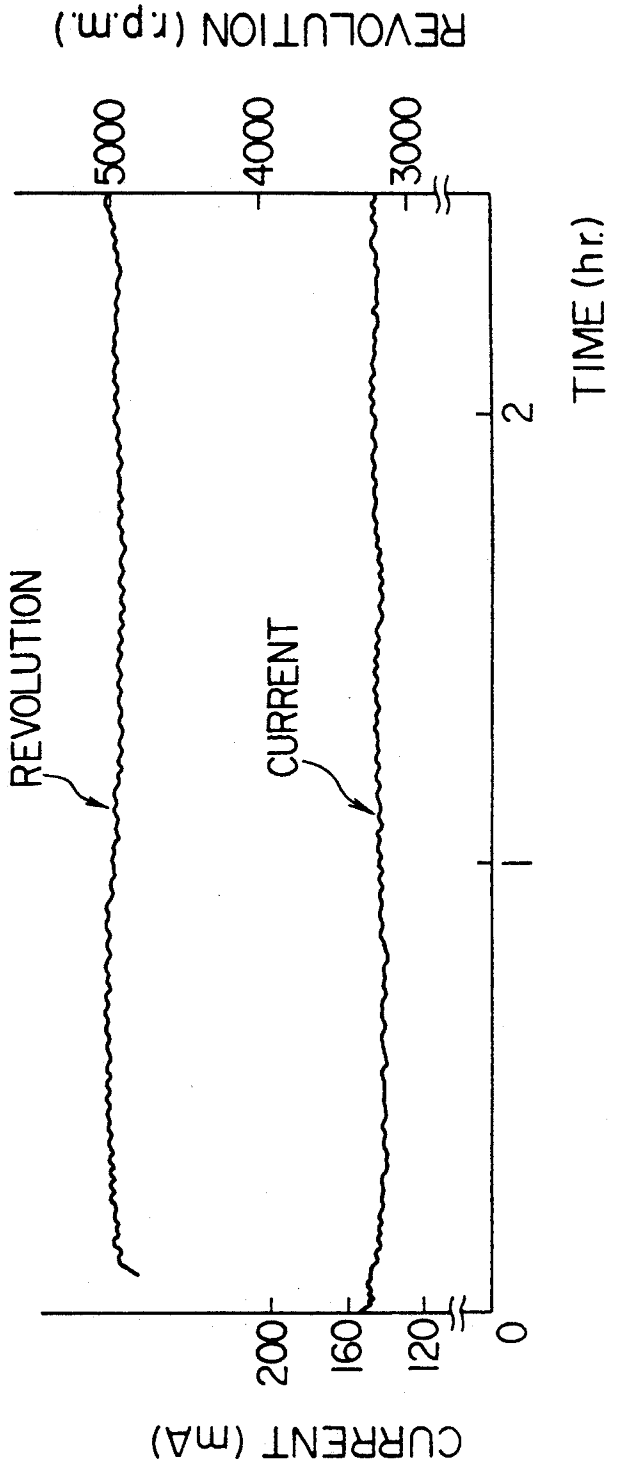
FIG. 14 showing the relationship among time, revolution and current.
Figure 15:
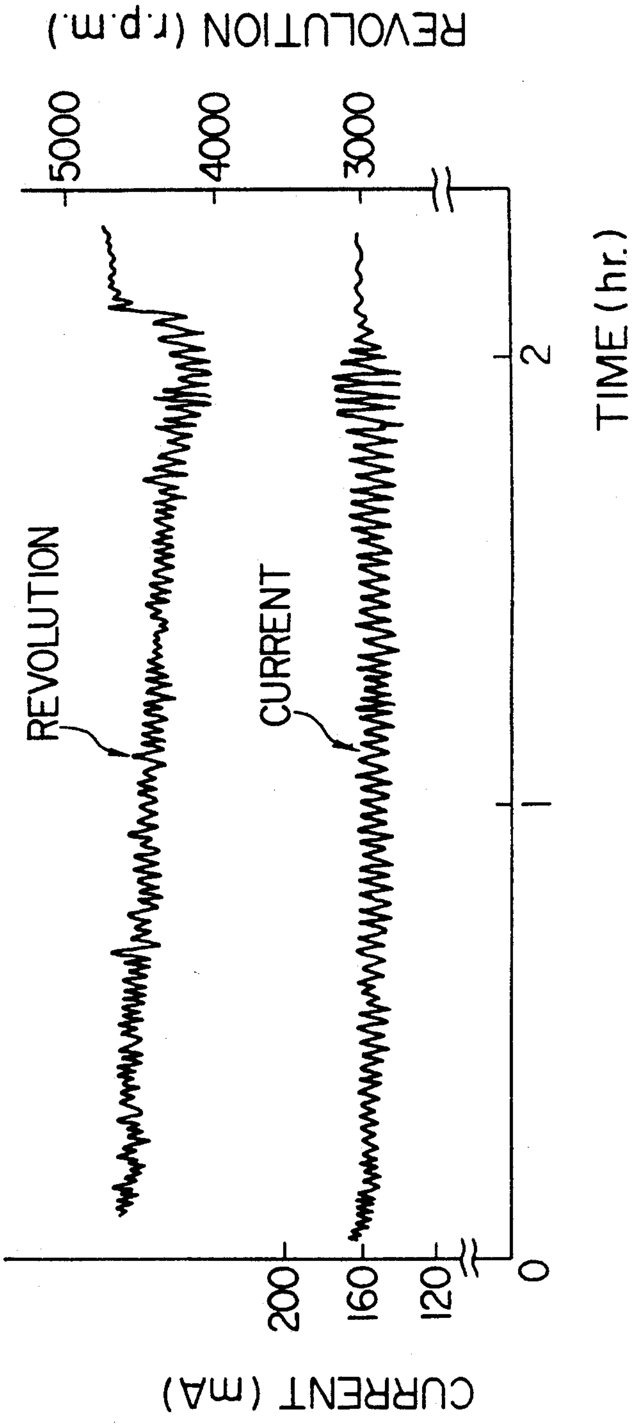
FIG. 15 (PRIOR ART)
FIG. 15 is a diagram illustrating prior art.

FIGS. 14 and 15 shows the relationship between the revolution and electric current in a miniature motor; FIG. 14 showing a miniature motor using the brush 7 of this invention, and FIG. 15 showing a miniature motor using a conventional type of brush. In FIG. 15, motor revolution is unstable, and the number of revolution is reduced with the lapse of time, while FIG. 14 reveals that the number of revolution is stable at approximately 5,000 rpm, with virtually no changes in revolution with time. As for current, FIG. 15 shows that there was considerable noise, with noise increasing with the lapse of time, while FIG. 14 indicates that there were few noises, and little changes with time were observed.

As described above, this invention makes it possible to suppress spark generation and stabilize commutated waveforms and revolution in a miniature motor in which a plurality of brush pieces make contact with the commutator because each brush piece passes the grooves of the commutator at different timing by providing different inclined angles to the tips of the brush pieces, thereby making the tangential lines at the points at which the tips of the brush pieces make contact with the commutator, that is, the contact positions different.

What is claimed is:

1. A miniature motor comprising:

a housing including a bottomed hollow cylindrical member defining an inner circumferential surface;

a permanent magnet fixedly fitted to said inner circumferential surface of said housing;

an end plate engaged with an open end of said housing;

a rotor rotatably supported by bearings provided on said housing and said end plate;

a commutator connected to said rotor;

brush means for providing power to said commutator, said brush means including a plurality of brush pieces, each of said brush pieces including a brush intermediate part extending in a brush piece longitudinal direction and a brush tip with bent portion defining a V-shape providing open legs, each tip of said each of said brush pieces making contact along a tangential line with respect to said commutator wherein said tangential line of each tip is different from an adjacent tip wherein each tip of said brush pieces has sides disposed at a different angle with respect to said line extending in said longitudinal direction as compared to an adjacent tip.

2. A miniature motor according to claim 1, wherein: two brush pieces are provided.

3. A miniature motor according to claim 1, wherein: three brush pieces are provided.

4. A miniature motor according to claim 1, wherein: a difference in an angle between said tangential lines at contact points of adjacent brush pieces is 7° to 25°.

5. A miniature motor according to claim 1, wherein: a width of each tip of said brush pieces is larger than a width of an intermediate part of said brush pieces.

6. A minature motor comprising:

a housing including a bottomed hollow cylindrical member defining an inner circumferential surface;

a permanent magnet fixedly fitted to said inner circumferential surface of said housing;

an end plate engaged with an open end of said housing;

a rotor rotatably supported by bearings provided on said housing and said end plate;

a commutator connected to said rotor;

brush means for providing power to said commutator, said brush means including a plurality of brush pieces, each of said brush pieces including a brush intermediate part extending in a brush piece longitudinal direction and a brush tip with bent portion defining a V-shape providing open legs, each tip of said each of said brush pieces making contact along a tangential line with respect to said commutator wherein said tangential line of each tip is different from an adjacent tip with one tangential line at a first angle with respect to said longitudinal direction and another tangential line at a second angle with respect to said longitudinal direction, said first and second angles being in different directions with respect to said longitudinal direction wherein each tip of said brush pieces has sides disposed at a different angle with respect to said line extending in said longitudinal direction as compared to adjacent tip.

* * * * *